Patented July 20, 1943

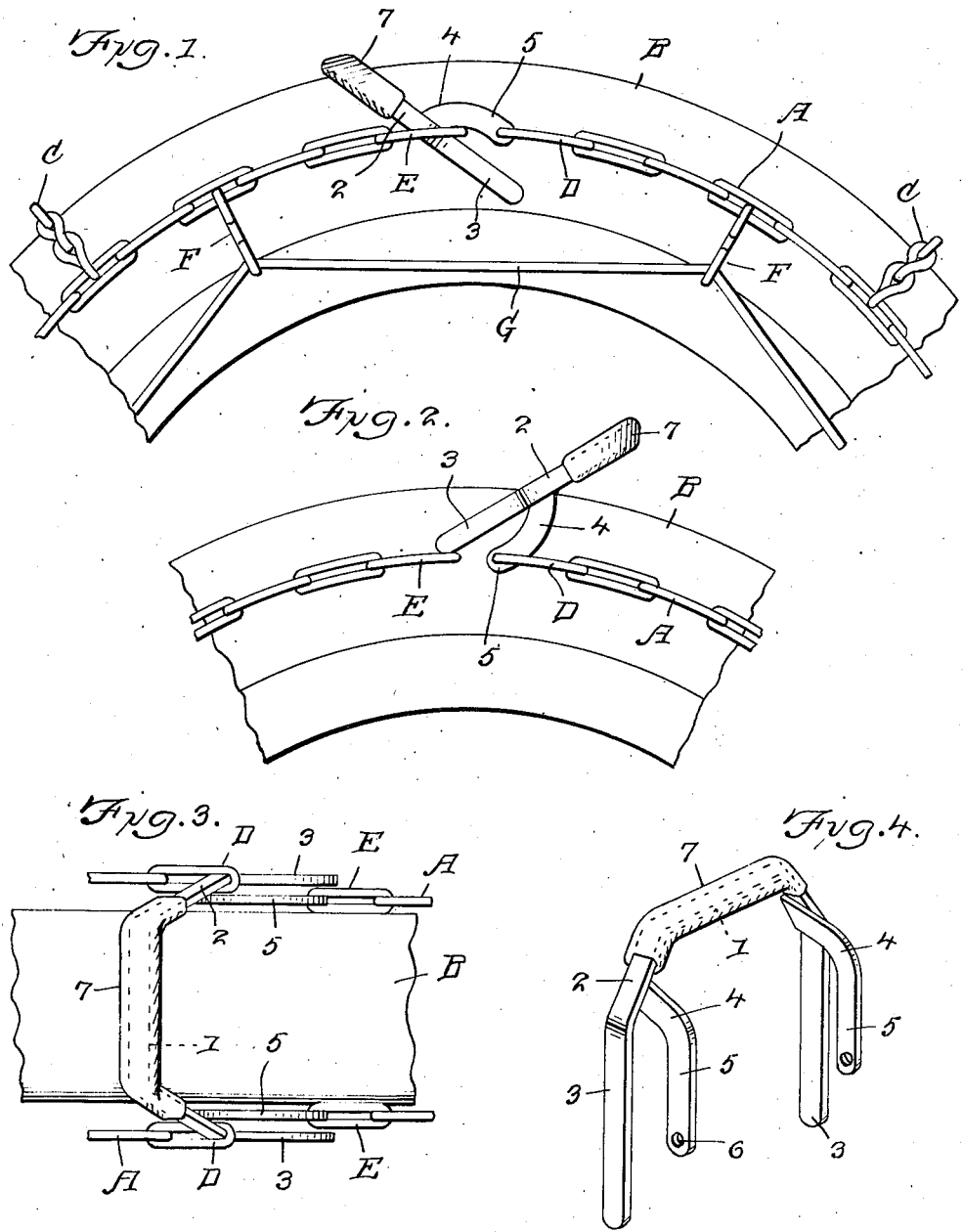

2,324,463

UNITED STATES PATENT OFFICE 2,324,463

TIRE CHAIN APPLICATOR AND FASTENING DEVICE

Vernon E. Brady, McKeesport, Pa.

Application March 6, 1942, Serial No. 433,659

5 Claims. (Cl. 152—219)

This invention relates to tire chain applying and fastening devices, and its general object is to provide a device that makes it possible to apply an anti-skid chain to a tired vehicle wheel in an easy and expeditious manner, and to simultaneously fasten the ends of the side chains together, the device being designed to act on the leverage principle and is pivotally connected to the end links at one of the ends of the side chains and is receivable through the opposite end links, whereby upon swinging movement of the device, the chain is drawn taut and is fastened accordingly against casual removal from the tire.

A further object is to provide a tire chain applying and fastening device that overcomes the difficulty experienced in fastening the ends of side chains together, by the hook means now in general use, in that my device eliminates hooks and other like fastening elements which necessitate individually fastening the side chains.

Another object is to provide a tire chain applying and fastening device that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a fragmentary side elevation illustrating my device in operative or fastened position for securing the chain to the tire.

Figure 2 is a similar view illustrating the device in a position just prior to being inserted in the free end links of the side chains.

Figure 3 is a top plan view, with the device in the position of Figure 1.

Figure 4 is a perspective view of the device per se.

Referring to the drawing in detail, the letter A indicates the side chains of an anti-skid chain for a vehicle tire B, and C the cross chains. The end links of the side chains are indicated respectively by the letters D and E. I have also illustrated a chain tightener that includes link hooks F mounted on certain links of the side chains, and a resilient or elastic band G extends through the hooks, as clearly shown in Figure 1, to hold the anti-skid chain against rattling and circumferential movement on the tire.

My device includes a substantially U-shaped body made from flat strip material to provide a bight member 1 having outwardly inclined or diverging end portions 2 extending from the ends of the intermediate portion of the bight member, and the end portions have formed on the outer ends thereof relatively long limbs 3 disposed in parallelism with each other, as best shown in Figure 4.

Welded or otherwise fixed to the inner or confronting faces of the inclined portions 2 substantially midway the ends thereof are the inner curved portions 4 of a pair of relatively short attaching arms that are likewise formed from resilient strip material. The portions 4 extend outwardly from the side edges of the portions 2, for disposal at an acute angle relative thereto, and the portions 4 merge into outer straight parallel portions 5 that have their outer ends terminating inwardly of the outer ends of the limbs 3, as best shown in Figure 4 which also illustrates that the portions 5 are disposed in planes between and paralleling the limbs 3. The parallel portions 5 of the arms have the end links D at one end of the side chains connected thereto, by said links being mounted in openings 6 adjacent to the outer ends of the portions 5.

While it is believed that the use and operation of my device will be obvious from the foregoing and the disclosure in the drawing, it might be mentioned that the device is first applied to the tire in straddling relation thereto, as best shown in Figure 3. When so disposed, the end links D will set up a clamping engagement with the tire upon opposite sides thereof, as likewise shown in Figure 3, due to the fact that the arms are spaced apart the proper distance to urge the links accordingly, thus it will be seen that the device is held on the tire to fulcrum or pivot on the links D. The chain is then trained about the tire and thence the device is swung to the position of Figure 2, the U-shaped body acting as a lever for that purpose. The limbs 3 are then inserted in the opposite end links E, as will be obvious from Figure 2. Finally the device is swung from the position of Figure 2, to that of Figure 1, and that swinging movement thereof will result in drawing the chain taut about the tire, as well as will position the links E at the juncture of the arms with the inclined portions 2 of the body.

When the device is in use, as shown in Figure 1, the side chains exert a pull against the device in opposite directions, thus it will be seen that the side chains act to hold the device in place, while the device acts to secure the chain to the tire.

The intermediate portion of the bight member is inclined transversely with respect to the portions 2, so as to lie substantially flat relative to the tread of the tire, when the device is in use, and the intermediate portion has a sleeve 7 of reinforced rubber or the like mounted thereon, to protect the same against wear. The sleeve is preferably of a length to extend beyond the intermediate portion so as to cover the adjacent portions of the inclined portions 2, as shown.

After the device has been applied to the tire, and fastened thereon by my device, the tightener as shown in Figure 1, can then be applied to the chain if desired, but the tightener is desirable only in the event the chain has a loose fit with the tire and it is not necessary or desirable when the chain is of a size to tightly fit the tire.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A device for applying and fastening an antiskid chain including side chains to a vehicle tire, comprising a substantially U-shaped body, arms secured to the U-shaped body and including parallel outer portions arranged outwardly of one side of the limbs of the U-shaped body but in planes between and paralleling the limbs, said arms being adapted to straddle the tire and having one of the end links of each side chain connected thereto for said links to act as pivots for the device, and said limbs being adapted to be passed through the opposite end links of the side chains to draw the anti-skid chain taut about the tire and for fastening said chain thereto.

2. A device for applying and fastening an antiskid chain including side chains to a vehicle tire, comprising a substantially U-shaped body including a bight member having a straight intermediate portion and outwardly inclined outer portions extending from the straight portion in diverging relation, parallel limbs formed on the inclined portions, arms including curved inner portions fixed to said inclined portions, parallel outer portions formed on the curved inner portions and arranged outwardly of one side of said limbs but in planes between and paralleling the limbs, said arms adapted to straddle the tire and having one of the end links of each side chain connected thereto for the said links to act as pivots for the device, and said limbs adapted to be passed through the opposite end links of the side chains to draw the anti-skid chain taut about the tire and for fastening said chain thereto.

3. A device for applying and fastening an antiskid chain including side chains to a vehicle tire, comprising a substantially U-shaped body including a bight member having a straight intermediate portion and outwardly inclined outer portions extending from the straight portion in diverging relation, parallel limbs formed on the inclined portions, arms including curved inner portions fixed to said inclined portions, parallel outer portions formed on the curved inner portions and arranged outwardly of one side of said limbs but in planes between and paralleling the limbs, said arms adapted to straddle the tire and having one of the end links of each side chain connected thereto for the said links to act as pivots for the device, said limbs adapted to be passed through the opposite end links of the side chains to draw the anti-skid chain taut about the tire and for fastening said chain thereto, said arms terminating at their outer ends short of the outer ends of said limbs, and an elastic sleeve covering the major portion of the bight member.

4. A device for applying and fastening an antiskid chain including side chains to a vehicle tire, comprising a substantially U-shaped body including a bight member having a straight intermediate portion and outwardly inclined outer portions extending from the straight portion in diverging relation, parallel limbs formed on the inclined portions, arms including curved inner portions fixed to said inclined portions, parallel outer portions formed on the curved inner portions and arranged outwardly of one side of said limbs but in planes between and paralleling the limbs, said arms adapted to straddle the tire and having one of the end links of each side chain connected thereto for the said links to act as pivots for the device, said limbs adapted to be passed through the opposite end links of the side chains to draw the anti-skid chain taut about the tire and for fastening said chain thereto, said arms terminating at their outer ends short of the outer ends of said limbs, an elastic sleeve covering the major portion of the bight member, and said straight intermediate portion being bent at a transverse inclination with respect to said inclined portions for the straight intermediate portion to lie substantially flat relative to the tread of the tire when the device is in use.

5. A device for applying and fastening an antiskid chain including side chains to a vehicle, comprising a substantially U-shaped body, arms secured to the body including parallel portions arranged on the inside of the body and parallel with the limbs thereof, means for securing the end links of a chain thereto, and said limbs adapted to pass through the opposite end links of the side chains to draw the anti-skid chains taut about a tire and for fastening said chain thereto.

VERNON E. BRADY.